US010262557B2

(12) United States Patent
Sullenberger et al.

(10) Patent No.: US 10,262,557 B2
(45) Date of Patent: Apr. 16, 2019

(54) OMNI-DIRECTIONAL SHOULDER ASSEMBLY FOR CRASH TEST DUMMY

(71) Applicant: Humanetics Innovative Solutions, Inc., Farmington Hills, MI (US)

(72) Inventors: Kris Sullenberger, Sandusky, OH (US); Paul Depinet, Norwalk, OH (US); Michael S. Beebe, Norwalk, OH (US)

(73) Assignee: HUMANETICS INNOVATIVE SOLUTIONS, INC., Farmington Hills, MI (US)

( * ) Notice: Subject to any disclaimer, the term of this patent is extended or adjusted under 35 U.S.C. 154(b) by 0 days.

(21) Appl. No.: 16/005,362

(22) Filed: Jun. 11, 2018

(65) Prior Publication Data

US 2018/0293914 A1   Oct. 11, 2018

Related U.S. Application Data

(63) Continuation of application No. 14/855,886, filed on Sep. 16, 2015, now Pat. No. 10,008,130.

(60) Provisional application No. 62/051,574, filed on Sep. 17, 2014.

(51) Int. Cl.
*G09B 23/32* (2006.01)
*G09B 23/28* (2006.01)

(52) U.S. Cl.
CPC ........... *G09B 23/288* (2013.01); *G09B 23/32* (2013.01)

(58) Field of Classification Search
CPC ..................................................... G09B 23/32
USPC ........................................................ 73/866.4
See application file for complete search history.

(56) References Cited

U.S. PATENT DOCUMENTS

| 3,664,038 A * | 5/1972 | Searle ............... G09B 23/32 434/274 |
| 4,261,113 A | 4/1981 | Alderson |
| 4,349,339 A | 9/1982 | Daniel |
| 5,317,931 A | 6/1994 | Kalami |
| 5,526,707 A | 6/1996 | Smrcka |
| 5,528,943 A | 6/1996 | Smrcka et al. |

(Continued)

FOREIGN PATENT DOCUMENTS

| JP | 3602829 B2 | 12/2004 |
| JP | 2012168007 A | 9/2012 |

OTHER PUBLICATIONS

International Search Report dated Nov. 25, 2015 for International Application No. PCT/US2015/050706.
Tornvall et al., Fredrik V., "A New THOR Shoulder Design: A Comparison with Volunteers, the Hybrid III, and THOR NT", Traffic Injury Prevention, vol. 8, No. 2, May 7, 2007, pp. 205-215, XP055225130, ISSN: 1538-9588, DOI: 10.1080/15389580601175284, the whole document.

(Continued)

*Primary Examiner* — Walter L Lindsay, Jr.
*Assistant Examiner* — Philipmarcus T Fadul
(74) *Attorney, Agent, or Firm* — Howard & Howard Attorneys PLLC (57) ABSTRACT

A shoulder assembly for a crash test dummy includes a movable clavicle adapted for attachment to a spine of the crash test dummy for freedom of movement in three-dimensional space, a scapula non-rigidly adapted mounted for attachment to the spine for freedom of movement in three-dimensional space, a shoulder cup member adapted for attachment to the spine in a plurality of axes for a shoulder joint, and an upper arm assembly having an arm bone made of a plastic material for operative attachment to the shoulder cup member to allow an impact on the shoulder of the dummy to move the shoulder assembly towards the spine.

18 Claims, 13 Drawing Sheets

(56) References Cited

U.S. PATENT DOCUMENTS

| | | | |
|---|---|---|---|
| 5,589,651 | A | 12/1996 | Viano et al. |
| 5,741,989 | A | 4/1998 | Viano et al. |
| 6,451,256 | B1 | 9/2002 | Sene |
| 6,982,409 | B2 | 1/2006 | Huang et al. |
| 7,086,273 | B2 | 8/2006 | Lipmyer |
| 8,407,033 | B2 | 3/2013 | Cooper et al. |
| 8,622,748 | B2 | 1/2014 | Wang et al. |
| 8,840,404 | B2 | 9/2014 | Arthur et al. |
| 9,043,187 | B2 | 5/2015 | Pang |
| 2007/0131043 | A1* | 6/2007 | Frost ............ G09B 23/32 73/866.4 |
| 2013/0122478 | A1* | 5/2013 | Takasu ........... G09B 23/28 434/275 |
| 2013/0327164 | A1 | 12/2013 | Wang |
| 2014/0190279 | A1* | 7/2014 | Been ............ G09B 23/32 73/866.4 |
| 2014/0190280 | A1 | 7/2014 | Been et al. |
| 2014/0294485 | A1 | 10/2014 | McInnis et al. |
| 2015/0086957 | A1 | 3/2015 | Gibbs et al. |

OTHER PUBLICATIONS

Sodeyama Y et al, The Designs and Motions of a Shoulder Structure with a Spherical Thorax, Scapulas and collarbones for Humanoid "Kojiro", Intelligent Robots and Systems, 2008. IROS 2008. IEEE/RSJ International Conference on, IEEE, Piscataway, NJ, USA, Sep. 22, 2008, pp. 1465-1470, XP032335818, DOI: 10.1109/IROS.2008. 4651221, ISBN: 978-1-4244-2057-5, the whole document.

Kozuki et al., Toyotaka, "Design of Upper Limb by Adhesion of Muscles and Bones—Detail Human Mimic Musculoskeletal Humanoid Kenshiro", 2013 IEEE/RSJ International Conference on Intelligent Robots and Systems, IEEE, Nov. 3, 2013, pp. 935-940, XP032537748, ISSN: 2153-0858, DOI: 10.1109/IROS.2013. 6696462 [retrieved on Dec. 26, 2013] the whole document.

International Preliminary Report on Patentability dated Jan. 4, 2017 for International Application No. PCT/US2015/050706.

PCT Written Opinion of the International Preliminary Examining Authority dated Aug. 26, 2016 for International Application No. PCT/US2015/050706.

* cited by examiner

OMNI-DIRECTIONAL SHOULDER ASSEMBLY FOR CRASH TEST DUMMY

CROSS-REFERENCE TO RELATED APPLICATION(S)

The present application is a continuation of U.S. Non-Provisional patent application Ser. No. 14/855,886, filed Sep. 16, 2015, which claims the benefit of U.S. Provisional Patent Application Ser. No. 62/051,574, filed Sep. 17, 2014, both of which are incorporated herein by reference in their entirety.

BACKGROUND OF THE INVENTION

1. Field of the Invention

The present invention relates generally to crash test dummies and, more particularly, to an omni-directional shoulder assembly for a crash test dummy.

2. Description of the Related Art

Automotive, aviation, and other vehicle manufacturers conduct a wide variety of collision testing to measure the effects of a collision on a vehicle and its occupants. Through collision testing, a vehicle manufacturer gains valuable information that can be used to improve the vehicle, authorities examine vehicles to submit type approval, and consumer organizations provide information on vehicle safety ratings to the public.

Collision testing often involves the use of anthropomorphic test devices, better known as "crash test dummies", to estimate a human's injury risk. The dummy must possess the general mechanical properties, dimensions, masses, joints, and joint stiffness of the humans of interest. In addition, they must possess sufficient mechanical impact response similitude and sensitivity to cause them to interact with the vehicle's interior in a human-like manner.

The crash test dummy typically includes a head assembly, spine assembly (including neck), rib cage assembly, abdomen, pelvis assembly, right and left arm assemblies, and right and left leg assemblies. Generally, the arm assembly has an upper arm assembly and a lower arm assembly. The upper arm assembly is typically connected to a shoulder assembly, which, in turn, is typically connected to the spine assembly.

Currently, there are no omni-directional crash test dummies for use in vehicle crash testing. These same crash test dummies suffer from a stiff metal upper arm bone that protects the rib cage from deformation and can generate high forces on the shoulder assembly. In addition, these crash test dummies do not have a shoulder assembly to move in three-dimensional space to mimic that of the human being. Thus, there is a need in the art for an omni-directional shoulder assembly for a crash test dummy that provides for a human range of motion in all three axes of a shoulder.

SUMMARY OF THE INVENTION

Accordingly, the present invention is an omni-directional shoulder assembly for a crash test dummy. The shoulder assembly includes a movable clavicle adapted for attachment to a spine of the crash test dummy for freedom of movement in three-dimensional space and a scapula non-rigidly adapted mounted for attachment to the spine for freedom of movement in three-dimensional space. The shoulder assembly includes a shoulder cup member adapted for attachment to the spine in a plurality of axes for a shoulder joint, and an upper arm assembly having an arm bone made of a plastic material for operative attachment to the shoulder cup member to allow an impact on the shoulder joint of the dummy to move the shoulder assembly towards the spine.

In addition, the present invention is a crash test dummy including a body and a spine assembly operatively attached to the body. The crash test dummy also includes an omni-directional shoulder assembly connected to the spine assembly. The shoulder assembly includes a movable clavicle for attachment to a spine assembly of the crash test dummy for freedom of movement in three-dimensional space and a scapula non-rigidly mounted for attachment to the spine assembly for freedom of movement in three-dimensional space. The shoulder assembly includes a shoulder cup member for attachment to the spine assembly in a plurality of axes for a shoulder joint, and an upper arm assembly having an arm bone made of a plastic material for operative attachment to the shoulder cup member to allow an impact on the shoulder joint of the dummy to move the shoulder assembly towards the spine assembly.

One advantage of the present invention is that a new omni-directional shoulder assembly is provided for a crash test dummy. Another advantage of the present invention is that the omni-directional shoulder assembly provides for a human range of motion in all three axes of a shoulder joint for the crash test dummy. Yet another advantage of the present invention is that the omni-directional shoulder assembly includes a non-rigidly mounted scapula and clavicle that are free to move in three-dimensional space for the crash test dummy. Still another advantage of the present invention is that the omni-directional shoulder assembly includes a humerus bone attached with a ball joint and the bone is made of a plastic material to mimic human skeletal weight and strength for the crash test dummy. A further advantage of the present invention is that the omni-directional shoulder assembly is a surrogate to mimic human responses in a vehicle safety restraint system for different modes of impact during vehicle crashes for the crash test dummy.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
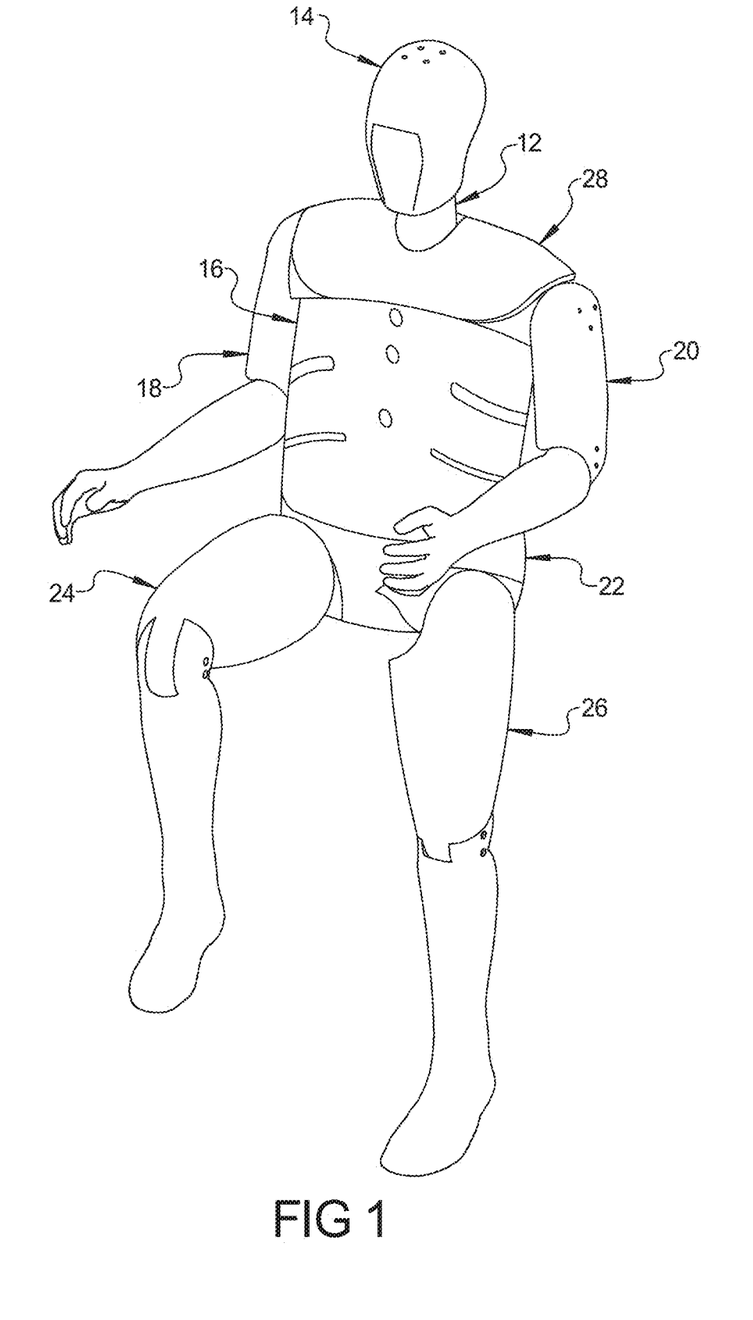
FIG. 1 is a perspective view of one embodiment of a crash test dummy, according to one embodiment of the present invention.

Referring to the drawings and in particular FIG. 1, one embodiment of a crash test dummy, according to the present invention, is generally indicated at 12. The crash test dummy 12 is of a 10.5 year old child and is illustrated in a standing position. This crash test dummy 12 is used primarily to test the performance of automotive interiors and restraint systems for front and rear seat occupants. The size and weight of the crash test dummy 12 are based on anthropometric studies, which are typically done separately by the following organizations, University of Michigan Transportation Research Institute (UMTRI), U.S. Military Anthropometry Survey (ANSUR), and Civilian American and European Surface Anthropometry Resource (CESAR). It should be appreciated that ranges of motions, centers of gravity, and segment masses simulate those of human subjects defined by the anthropometric data.

Figure 2:
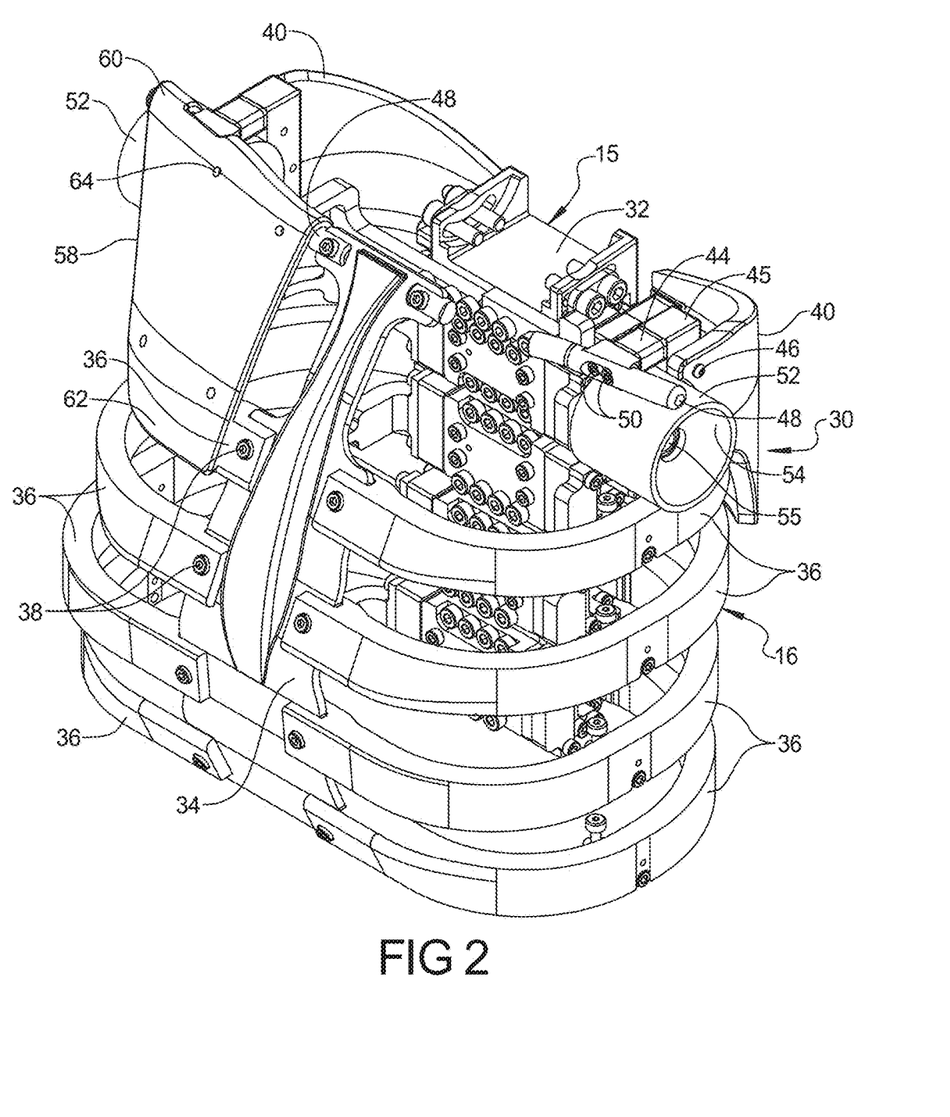
FIG. 2 is a perspective view of an omni-directional shoulder assembly, according to one embodiment of the present invention, of the crash test dummy of FIG. 1.
Figure 3:
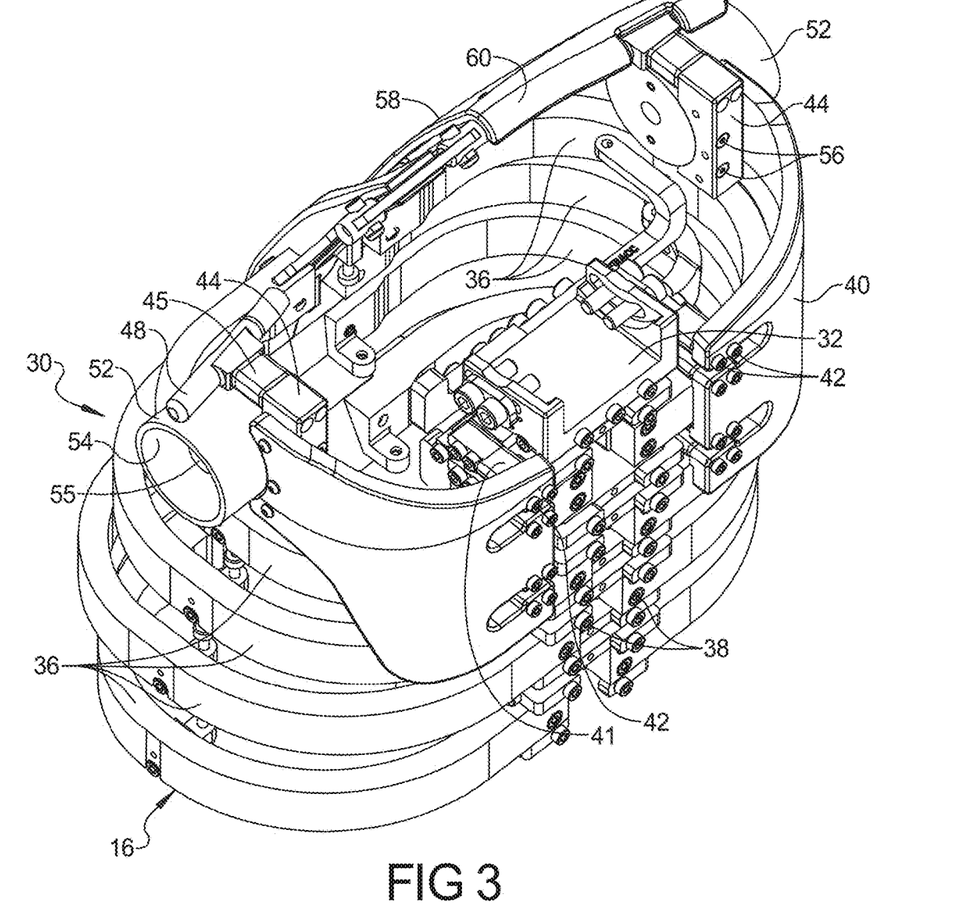
FIG. 3 is another perspective view of the omni-directional shoulder assembly of FIG. 2 for the crash test dummy of FIG. 1.
Figure 4:
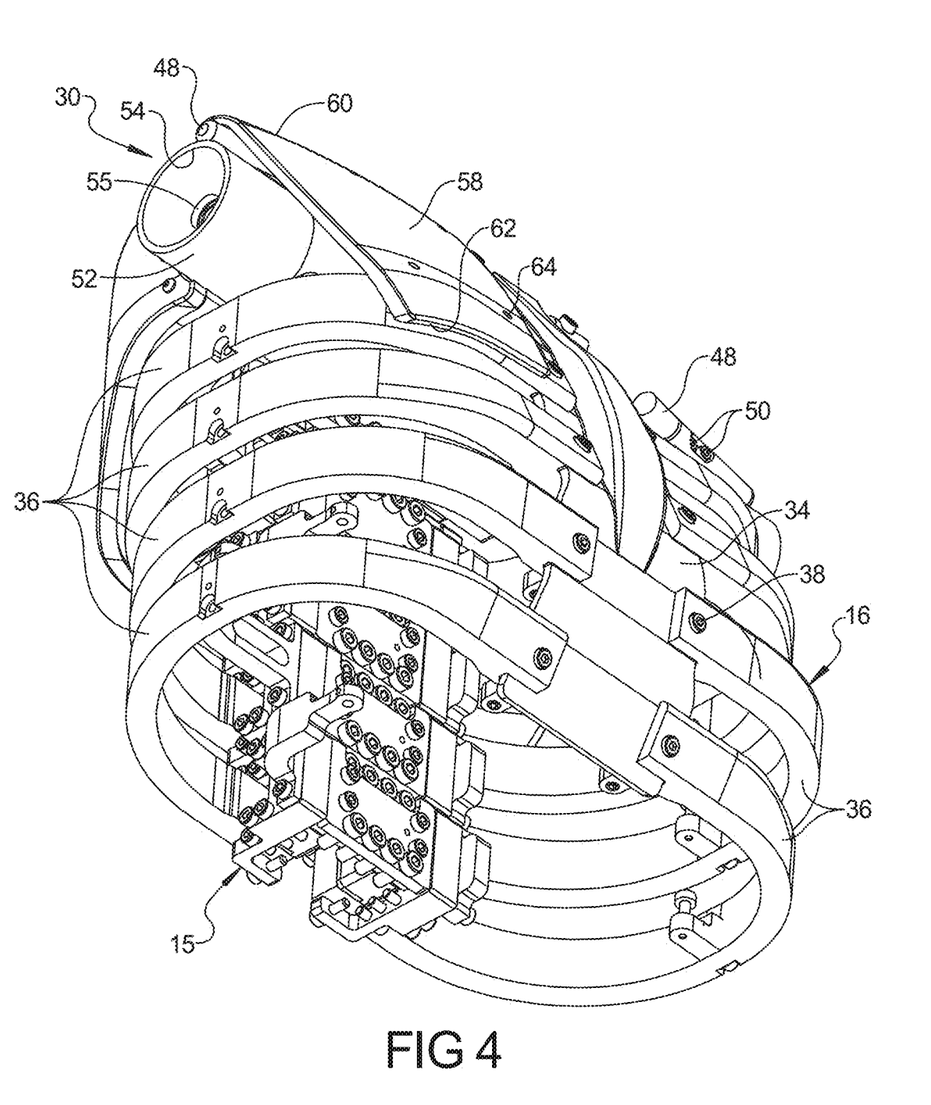
FIG. 4 is yet another perspective view of the omni-directional shoulder assembly of FIG. 2 for the crash test dummy of FIG. 1.
Figure 5:
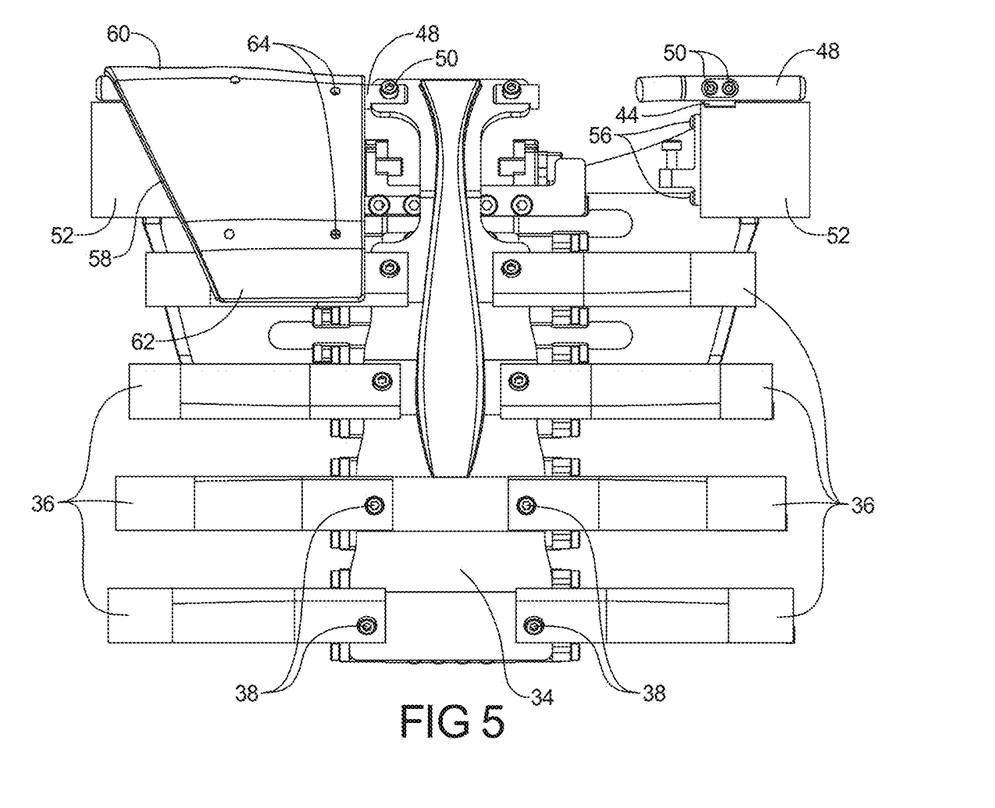
FIG. 5 is a front view of the omni-directional shoulder assembly of FIG. 2 illustrated in operational relationship with a portion of the crash test dummy of FIG. 1.
Figure 6:
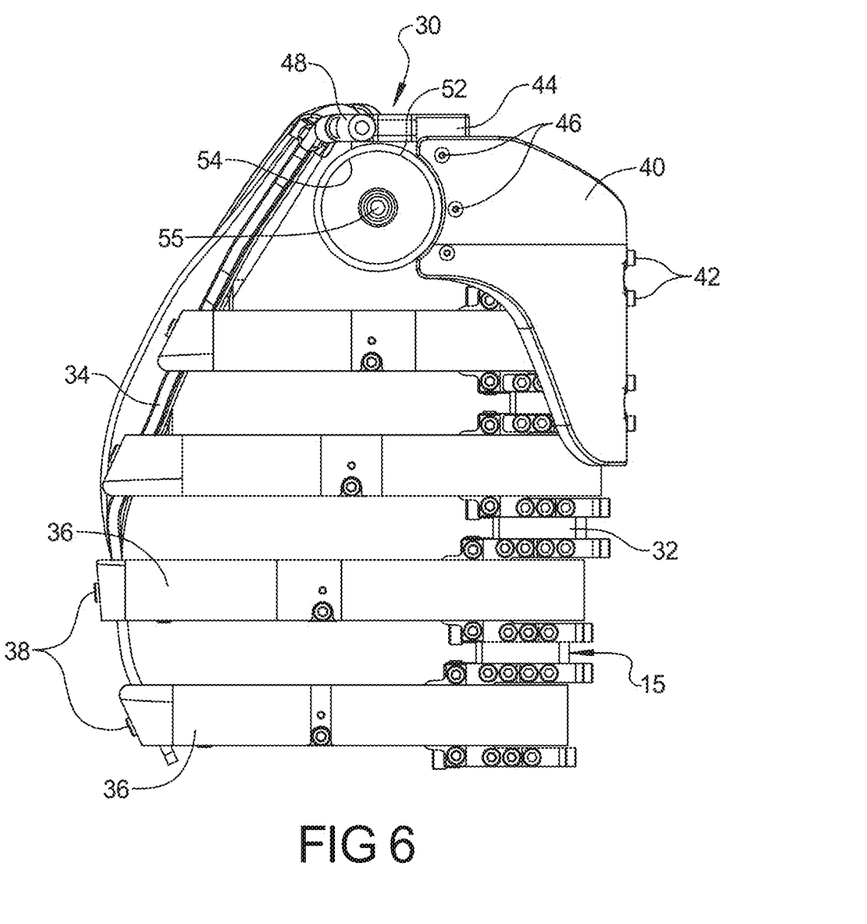
FIG. 6 is a left side view of the omni-directional shoulder assembly of FIG. 5.
Figure 7:
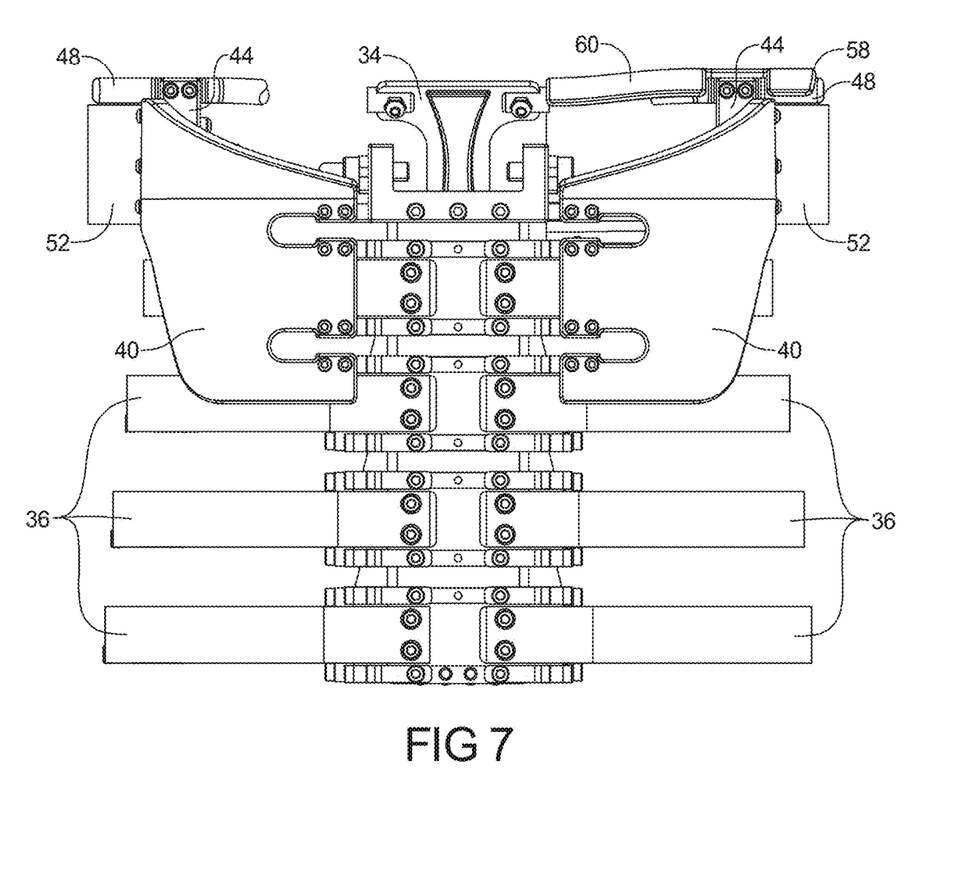
FIG. 7 is a rear view of the omni-directional shoulder assembly of FIG. 5.
Figure 8:
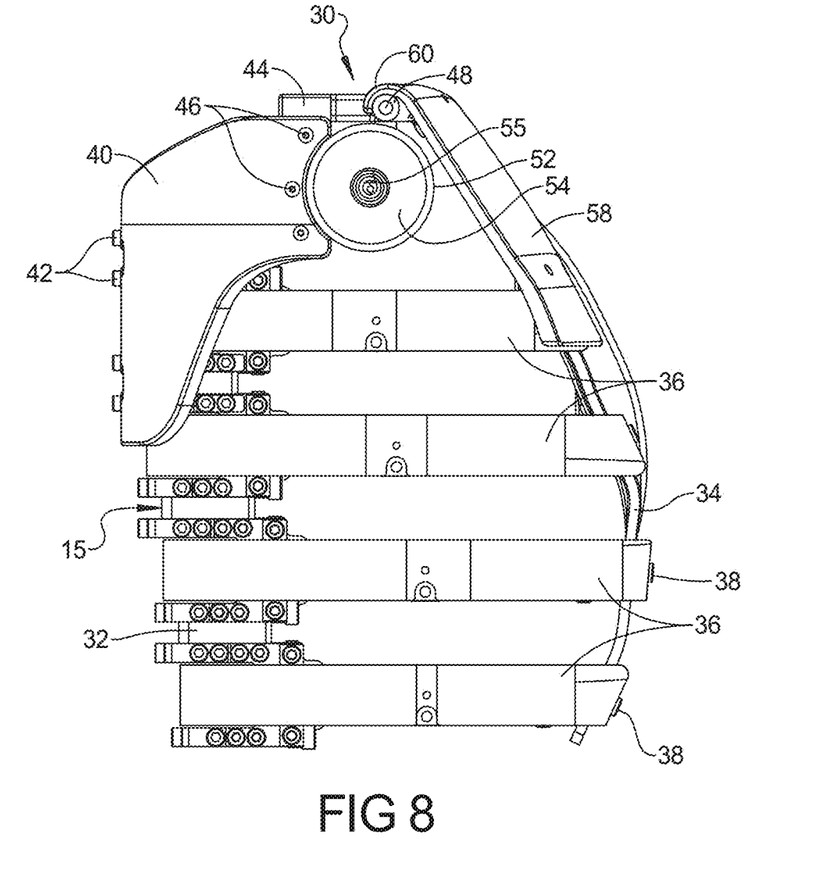
FIG. 8 is a right side view of the omni-directional shoulder assembly of FIG. 5.
Figure 9:
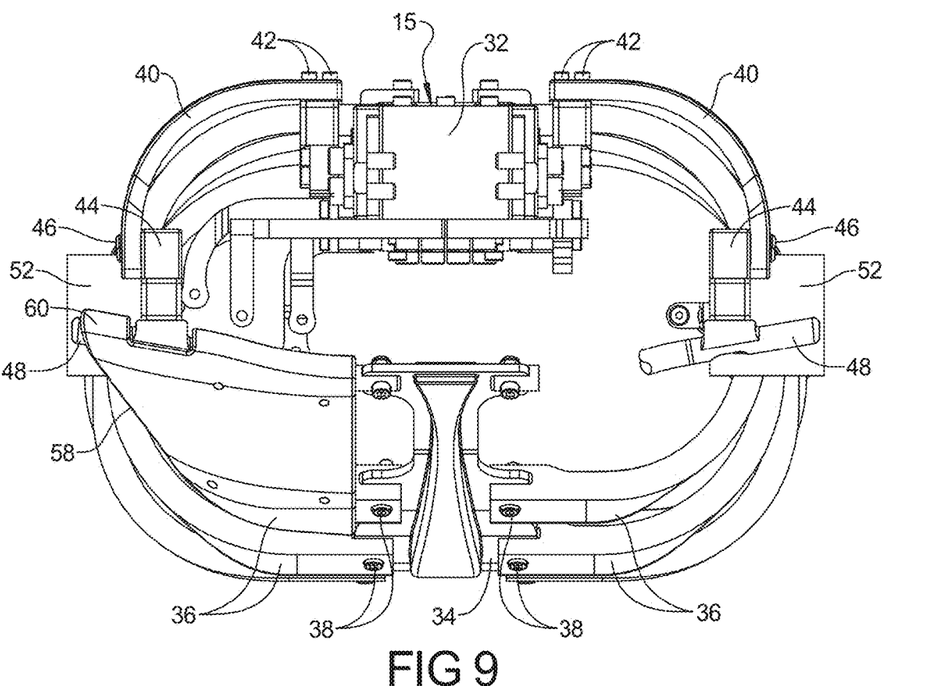
FIG. 9 is a top view of the omni-directional shoulder assembly of FIG. 5.
Figure 10:
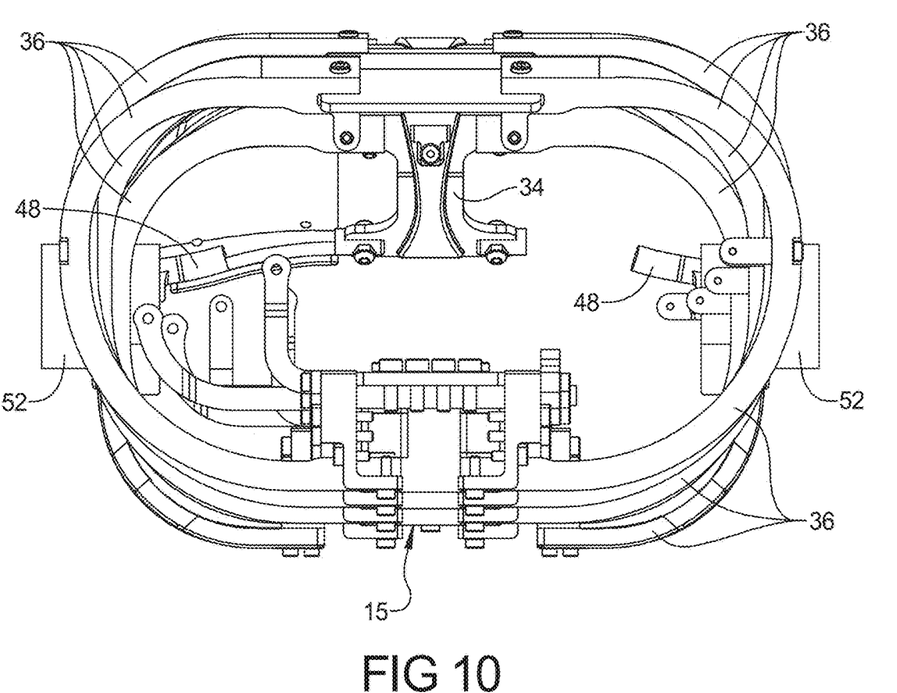
FIG. 10 is a bottom view of the omni-directional shoulder assembly of FIG. 5.
Figure 11:
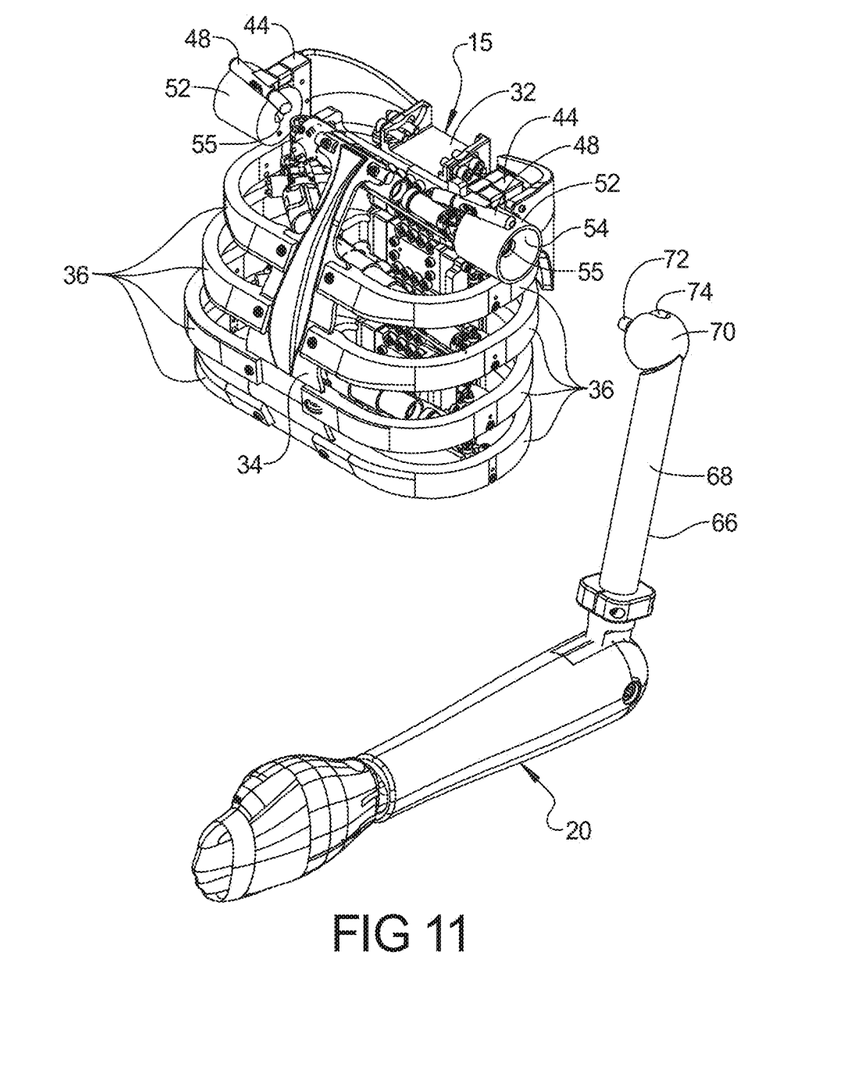
FIG. 11 is a perspective exploded view of the omni-directional shoulder assembly of FIG. 5 illustrating an arm assembly of the crash test dummy of FIG. 1.
Figure 12:
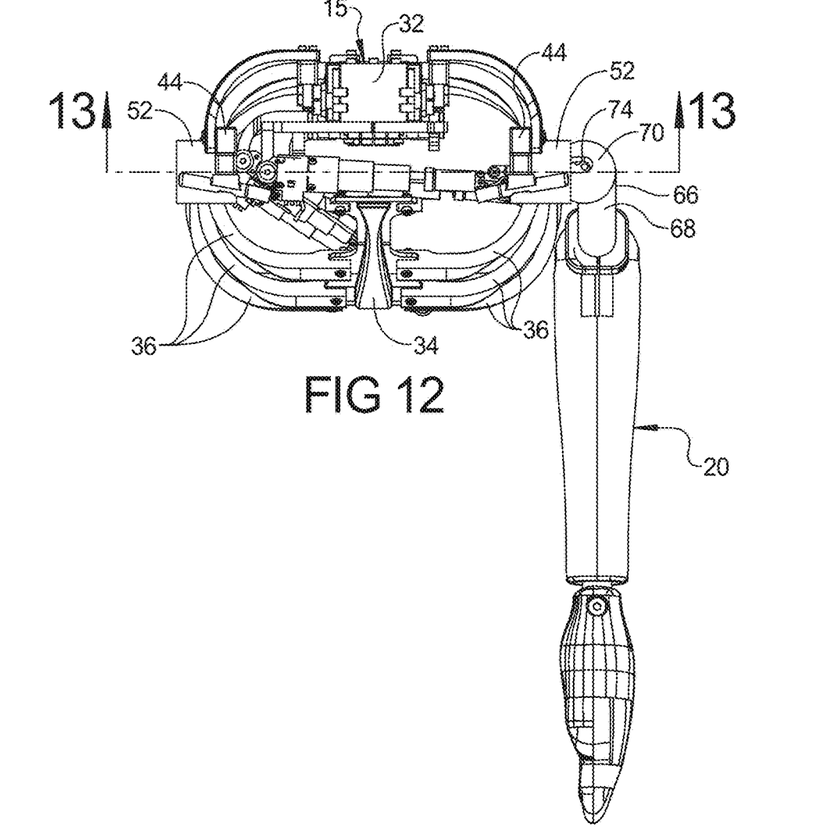
FIG. 12 is a top view of the omni-directional shoulder assembly of FIG. 5 illustrating an arm assembly of the crash test dummy of FIG. 1.
Figure 13:
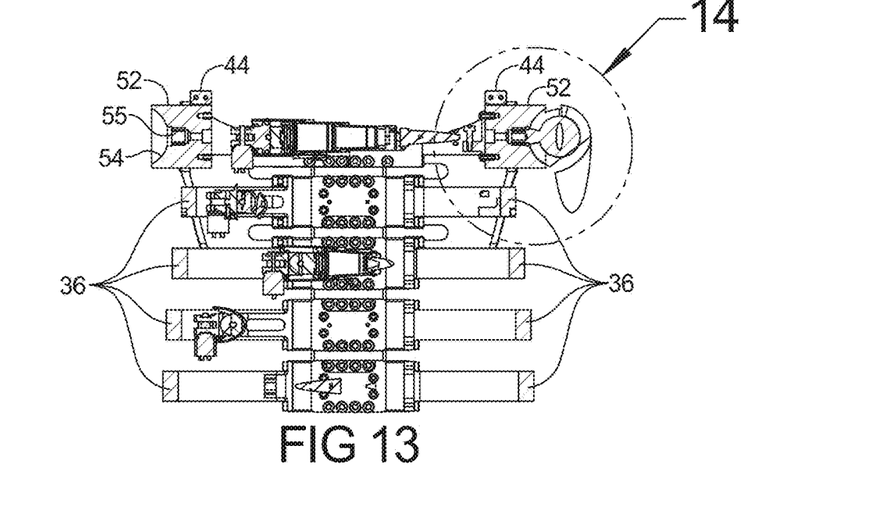
FIG. 13 is a sectional view taken along line 13-13 of FIG. 12.
Figure 14:
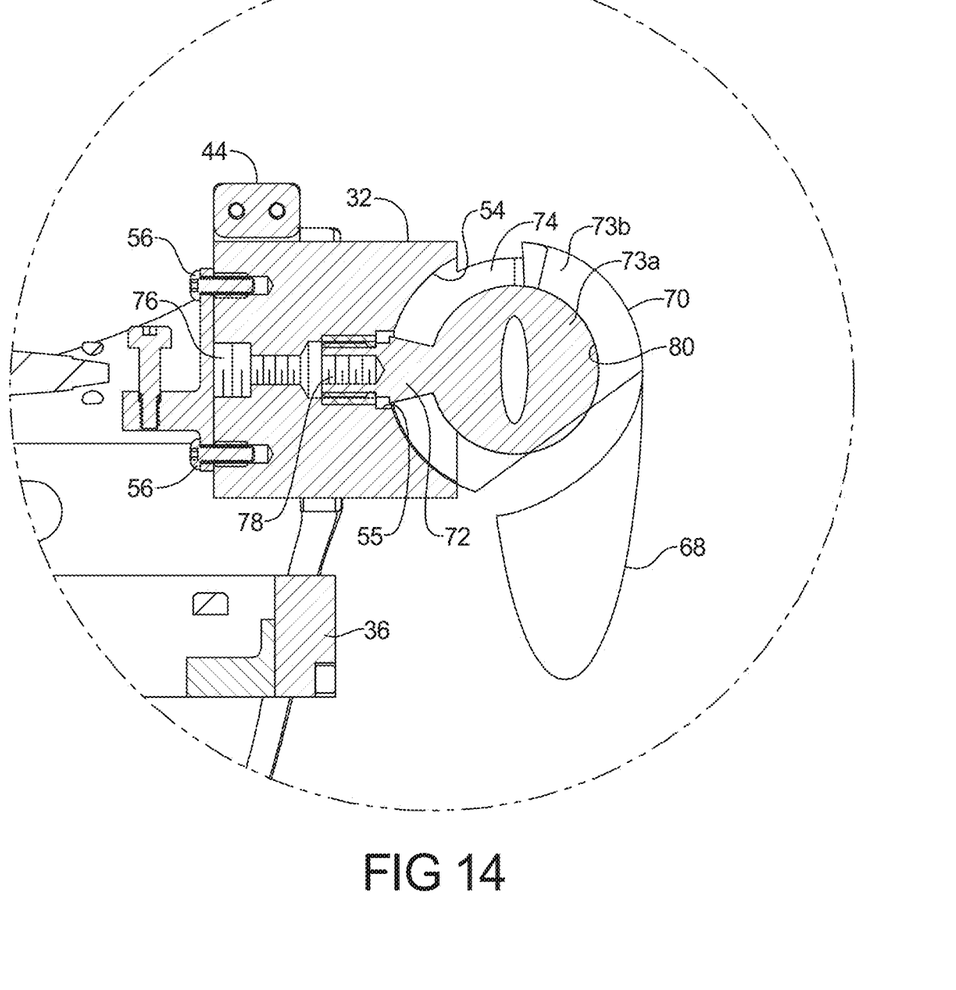
FIG. 14 is an enlarged view of a portion of the omni-directional shoulder assembly in circle 14 of FIG. 13.

As illustrated in FIG. 1, the crash test dummy 12 includes a head assembly, generally indicated at 14. The crash test dummy 12 also includes a spine assembly, generally indicated at 15, (FIG. 2) having an upper end mounted to the head assembly 14 and a lower end extending into a torso area of the crash test dummy 12. It should be appreciated that the spine assembly 15 includes a neck (not shown) attached to the head assembly 14.

The torso area of the crash test dummy 12 also includes a rib cage or torso assembly, generally indicated at 16, connected to the spine assembly 15. The crash test dummy 12 also has a pair of arm assemblies including a right arm assembly, generally indicated at 18, and a left arm assembly, generally indicated at 20, which are attached to the crash test dummy 12 via an omni-directional shoulder assembly 30, according to the present invention, to be described. It should be appreciated that a lower end of the spine assembly 15 is connected to a lumbar-thoracic adapter (not shown), which is connected to a lumbar to pelvic adapter (not shown).

As illustrated in the FIG. 1, the crash test dummy 12 includes a pelvis assembly, generally indicated at 22, connected to the adapter. The crash test dummy 12 also includes a right leg assembly 24 and a left leg assembly 26, which are attached to the pelvis assembly 22. It should be appreciated that various components of the crash test dummy 12 may be covered in a polyvinyl skin such as a flesh and skin assembly, generally indicated at 28 and partially shown, for biofidelity of the crash test dummy 12.

Referring to FIGS. 2 through 14, one embodiment of an omni-directional shoulder assembly 30, according to the present invention, is shown for the crash test dummy 12. The shoulder assembly 30 can be used on both the right hand and left hand positions of the crash test dummy 12 with different parts mirrored on a mid-sagittal plane. In the embodiment illustrated, one shoulder assembly 30 is on the right hand position of the crash test dummy 12 and another shoulder assembly 30 is on the left hand position of the crash test dummy 12. Since the shoulder assembly 30 is symmetric for each of the right hand and left hand positions of the crash test dummy 12, only one shoulder assembly 30 will be subsequently described. It should be appreciated that the subsequent description of the shoulder assembly 30 is the same for both the right hand and left hand positions of the crash test dummy 12.

As illustrated, the shoulder assembly 30 is connected to the spine assembly 15. The spine assembly 15 includes a neck (not shown) connected to the head assembly 14 and a spine box 32 connected to the neck. The neck has a lower end connected to by a suitable attachment such as one or more fasteners (not shown) to the spine box 32. It should be appreciated that the fasteners threadably engage apertures (not shown) in the spine box 32 to secure the neck to the spine box 32.

The torso assembly 16 includes a sternum 34 spaced forwardly from the spine box 32. The sternum 34 is generally rectangular in shape, but may be any suitable shape. The torso assembly 16 also includes one or more ribs 36 extending between the spine box 32 and sternum 34. The ribs 36 are generally arcuate in shape and generally rectangular in cross-sectional shape, but may be any suitable shape. The ribs 36 are vertically spaced along the spine box 32 and sternum 34. The ribs 36 are connected to the spine box 32 and sternum 34 by a suitable mechanism such as one or more fasteners 38.

As illustrated in one embodiment, the shoulder assembly 30 includes a pair of scapulas 40 connected to the spine box 32. The scapulas 40 are generally triangular and arcuate in shape. The scapulas 40 are made of a plastic material such as polyurethane. The scapulas 40 have one end mounted to one or more mounting members 41 of the spine box 32 by a suitable mechanism such as one or more fasteners 42. The mounting members 41 are generally rectangular in shape, but may be any suitable shape. The mounting members 41 are made of an elastomeric material such as rubber. The mounting members 41 are mounted to the spine box 32 by one or more fasteners 38. The scapulas 40 are non-rigidly mounted to the spine box 32 via the mounting members 41 such that the scapulas 40 are free to move in three-dimensional space. It should be appreciated that the scapula 40 has the ability to slide freely and is not rigidly affixed to the spine box 32. It should also be appreciated that the mounting members 41 allow the scapulas 40 to slide over the ribs 36 without contacting them.

The shoulder assembly 30 also includes a pair of mounting brackets 44 at one end of the scapulas 40 and connected to the scapulas 40 by a suitable mechanism such as fasteners 46. The mounting bracket 44 is made of a metal material such as steel and aluminum. The shoulder assembly 30 also includes a pair of clavicles 48 mounted to the sternum 34 and to one or more mounting members 45 of the mounting brackets 44 by a suitable mechanism such as fasteners 50. The mounting members 45 are generally rectangular in shape, but may be any suitable shape. The mounting members 45 are made of an elastomeric material such as rubber. The clavicles 48 are generally cylindrical in shape and extend transversely across the torso. The clavicles 48 are non-rigidly mounted via the mounting members 45 to the mounting brackets 44 such that the clavicles 48 are free to move in three-dimensional space. It should be appreciated that the clavicles 48 have a free range of motion and are not rigidly attached to the sternum 34.

In operation, an impact on the shoulder assembly 30 of the crash test dummy 12 would move the shoulder assembly 30 towards the spine assembly 15. The shoulder assembly 30 is supported only by the scapula 40 and clavicle 48. The mounting members 41 and 45 would shear and stretch towards the spine assembly 15 which, in turn, would allow the scapula 40 to slide over the ribs 36 without any contact being applied to the ribs 36. Although the scapula 40 and clavicle 48 are attached to the spine assembly 15 and sternum 34, the mounting members 41 and 45 allow for movement of the scapula 40 and clavicle 48 without having any or minimal movement to the remainder of the crash test dummy 12.

The shoulder assembly 30 also includes a shoulder cup member 52 mounted to the mounting bracket 44. The shoulder cup member 52 is generally cylindrical in shape and extends laterally. The shoulder cup member 52 has a socket 54 extending axially therein to form a shoulder ball joint. The socket 54 is generally hemi-spherical in shape. The shoulder cup member 52 also has an aperture 55 extending from a bottom of the socket 54 axially therethrough. The shoulder cup member 52 is made of a metal material such as steel and aluminum. The shoulder cup member 52 is connected to the mounting bracket 44 by a suitable mechanism such as fasteners 56.

The shoulder assembly 30 also includes a pair of breastplates 58 connected to the clavicles 48. The breastplates 58 are generally trapezoidal in shape and extend from a relatively large width first end 60 to a relatively smaller width second end 62. The first end 60 is generally arcuate in shape and disposed over the clavicle 48. The breastplates 58 are made of a plastic material. The breastplates 58 may be secured to the clavicle 48 and ribs 36 by a suitable mechanism such as fasteners 64.

The shoulder assembly 30 further includes an upper arm portion 66 of the arm assembly 18, 20. The upper arm portion 66 includes a humerous bone 68 disposed therein and extending axially. The upper arm portion 66 is made with solid flesh (not shown) extending around the bone 68. The bone 68 is made of a plastic material such as nylon. The upper arm portion 66 includes a ball 70 at one end of the bone 68 having a threaded fastener 72 molded inside it. The ball 70 has an inner portion 73a made of a metal material such as aluminum and may have an outer portion 73b made of an elastomeric material such as urethane molded around the inner portion 73a. The ball 70 is disposed in the socket 54 and connected to the socket portion 54. The ball 70 also has a slot 74 in the outer portion 73b. The threaded fastener 72 on the ball 70 gets threaded into the shoulder cup 52. A fastener 76 is inserted into the opposite end of the shoulder cup 52 and into a threaded hole 78 in the end of the threaded fastener 72 which keeps the threaded fastener 72 from backing out when the upper arm portion 66 rotates. The bone 68 has an aperture 80 extending therethrough disposed about the inner portion 73a of the ball 70 and in the slot 74 of the outer portion 73b of the ball 70. It should be appreciated that the outer portion 73a rides inside the socket 54 on the shoulder cup 52. It should also be appreciated that the ball joint allows the arm assembly 20 to be lifted up and down and allows the entire arm assembly 20 to rotate 360 degrees inside the shoulder cup 52. It should be appreciated that the bone 68 is attached with the ball joint and the bone structures are made of plastic materials to mimic human skeletal weight and strength.

Accordingly, the omni-directional shoulder assembly 30 of the present invention allows omni direction measurements. In addition, the omni-directional shoulder assembly 30 of the present invention meets lateral and frontal biofidelity of the crash test dummy 12. The omni-directional shoulder assembly 30 also has the ability to move in three-dimensional space (i.e., all three axes) to mimic that of a human being. It should be appreciated that the crash test dummy 12 with the omni-directional shoulder assembly 30 is a surrogate to mimic human responses in an automotive restraint system for different modes of impact during automobile crash tests.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A shoulder assembly for a crash test dummy comprising:
   a spine box;
   at least one non-rigid mounting member secured to said spine box with said mounting member formed of an elastomeric material;
   a scapula mounted to said mounting member to couple said scapula to said spine box for freedom of movement in three-dimensional space;
   a movable clavicle operatively attached to said scapula for freedom of movement in three-dimensional space;
   a shoulder cup supported only by said scapula and said clavicle in a plurality of axes for a shoulder joint; and
   an upper arm assembly having an arm bone operatively attached to said shoulder cup to allow an impact on the shoulder joint of the crash test dummy to move the shoulder assembly towards said spine box.

2. A shoulder assembly as set forth in claim 1 including a ball at one end of said arm bone operatively connected to said shoulder cup.

3. A shoulder assembly as set forth in claim 2 wherein said ball has an inner portion made of a metal material and an outer portion made of an elastomeric material disposed about an outer surface of said inner portion.

4. A shoulder assembly as set forth in claim 3 wherein said outer portion of said ball includes a slot therein to allow said bone to rotate.

5. A shoulder assembly as set forth in claim 1 wherein said mounting member is disposed between said scapula and said spine box.

6. A shoulder assembly as set forth in claim 1 wherein said at least one non-rigid mounting member includes a first mounting member secured to one area of said spine box, and a second non-rigid mounting member formed of an elastomeric material and secured to another area of said spine box.

7. A shoulder assembly as set forth in claim 6 wherein said first and second mounting members are secured to opposite sides of said spine box.

8. A shoulder assembly as set forth in claim 6 wherein said scapula is further defined as a pair of scapulas with one scapula mounted to said first mounting member and the other scapula mounted to said second mounting member.

9. A shoulder assembly as set forth in claim 8 wherein said movable clavicle is further defined as a pair of movable clavicles, and said shoulder cup is further defined as a pair of shoulder cups with each shoulder cup supported only by one of said scapulas and one of said clavicles.

10. A crash test dummy comprising:
a body;
a spine assembly operatively attached to said body, said spine assembly including a spine box; and
a shoulder assembly operatively attached to said spine assembly and comprising
at least one non-rigid mounting member secured to said spine box with said mounting member formed of an elastomeric material,
a scapula mounted to said mounting member to couple said scapula to said spine box for freedom of movement in three-dimensional space,
a movable clavicle operatively attached to said scapula for freedom of movement in three-dimensional space,
a shoulder cup supported only by said scapula and said clavicle in a plurality of axes for a shoulder joint, and
an upper arm assembly having an arm operatively attached to said shoulder cup to allow an impact on the shoulder joint of said crash test dummy to move said shoulder assembly towards said spine assembly.

11. A crash test dummy as set forth in claim 10 including a ball at one end of said arm bone operatively connected to said shoulder cup.

12. A crash test dummy as set forth in claim 11 wherein said ball has an inner portion made of a metal material and an outer portion made of an elastomeric material disposed about an outer surface of said inner portion.

13. A crash test dummy as set forth in claim 12 wherein said outer portion of said ball includes a slot therein to allow said bone to rotate.

14. A crash test dummy as set forth in claim 10 wherein said mounting member is disposed between said scapula and said spine box.

15. A crash test dummy as set forth in claim 10 wherein said at least one non-rigid mounting member includes a first mounting member secured to one area of said spine box, and a second non-rigid mounting member formed of an elastomeric material and secured to another area of said spine box.

16. A crash test dummy as set forth in claim 15 wherein said first and second mounting members are secured to opposite sides of said spine box.

17. A crash test dummy as set forth in claim 15 wherein said scapula is further defined as a pair of scapulas with one scapula mounted to said first mounting member and the other scapula mounted to said second mounting member.

18. A crash test dummy as set forth in claim 17 wherein said movable clavicle is further defined as a pair of movable clavicles, and said shoulder cup is further defined as a pair of shoulder cups with each shoulder cup supported only by one of said scapulas and one of said clavicles.

* * * * *